July 10, 1934.  C. W. VOGT  1,965,618
METHOD OF PROCESSING PLASTIC COMESTIBLES
Filed Nov. 13, 1930  4 Sheets-Sheet 1
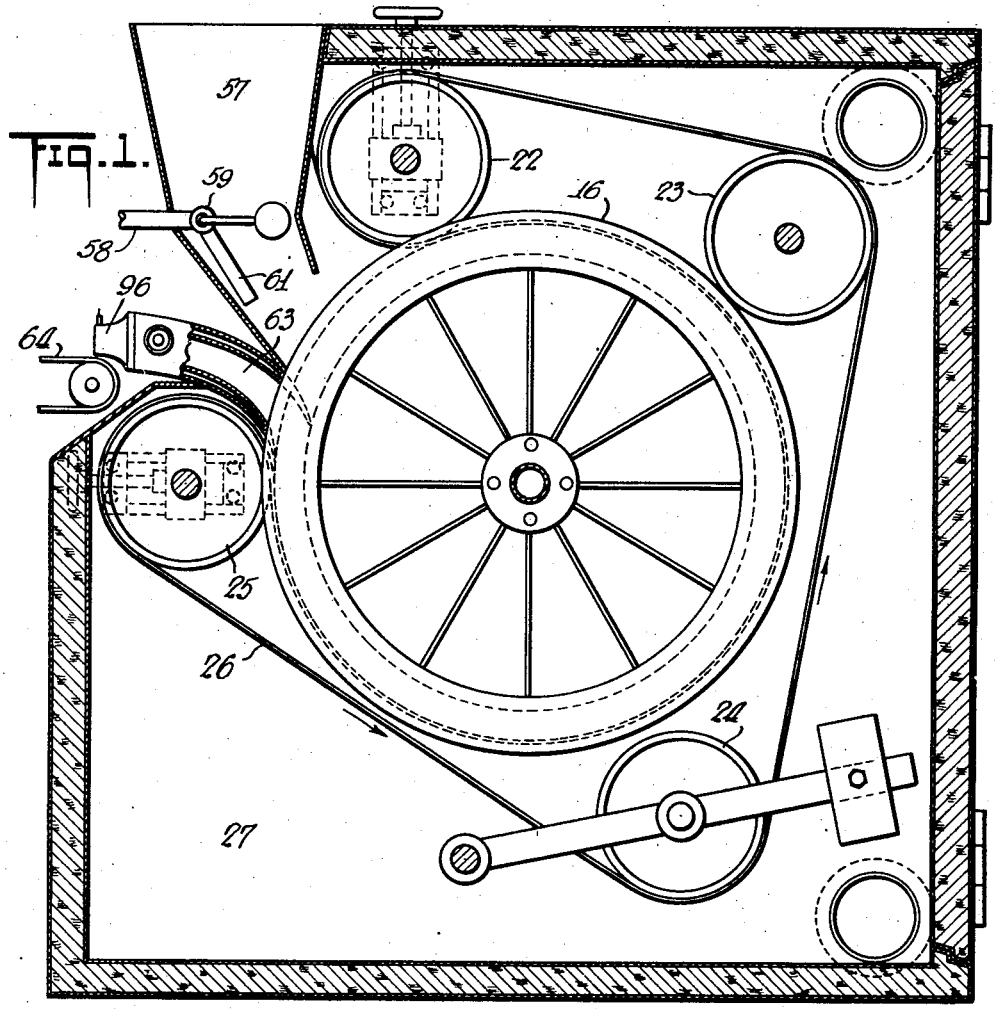
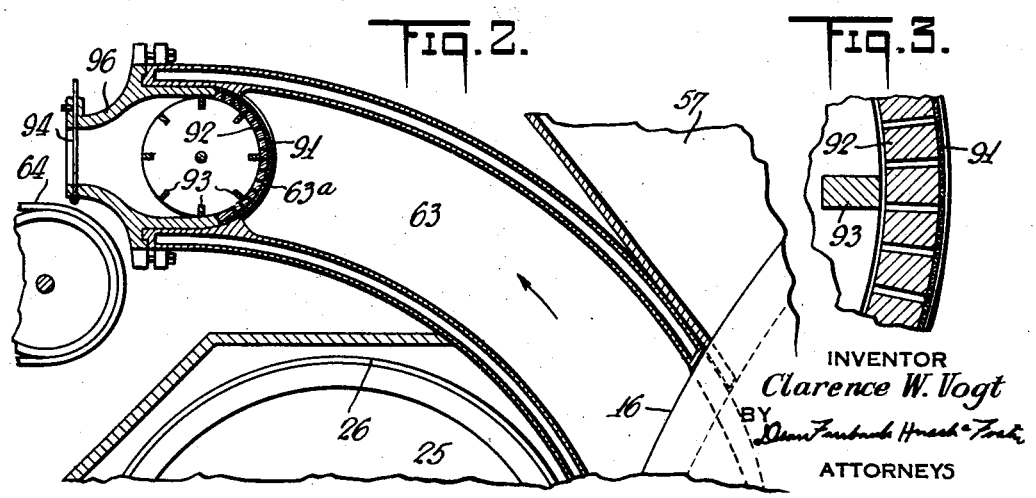
INVENTOR
Clarence W. Vogt
BY
ATTORNEYS July 10, 1934.   C. W. VOGT   1,965,618
METHOD OF PROCESSING PLASTIC COMESTIBLES
Filed Nov. 13, 1930   4 Sheets-Sheet 2
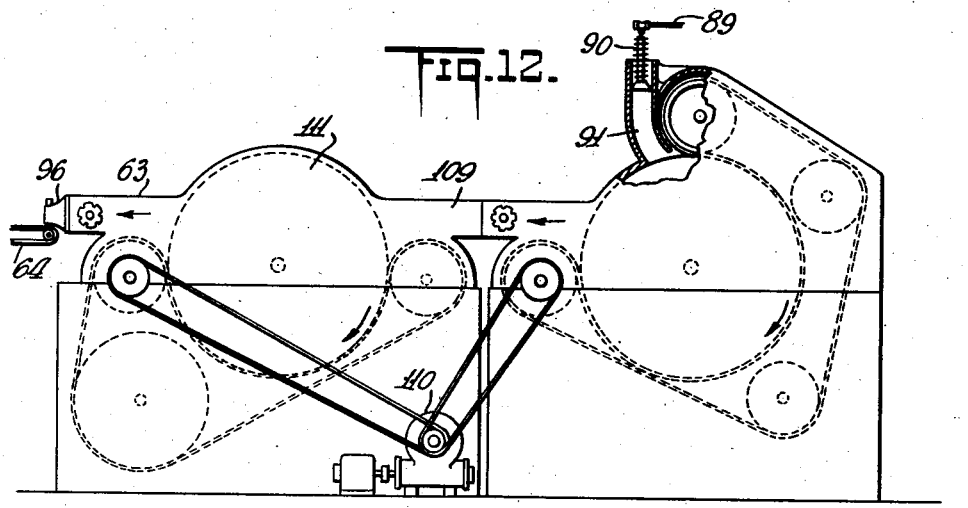
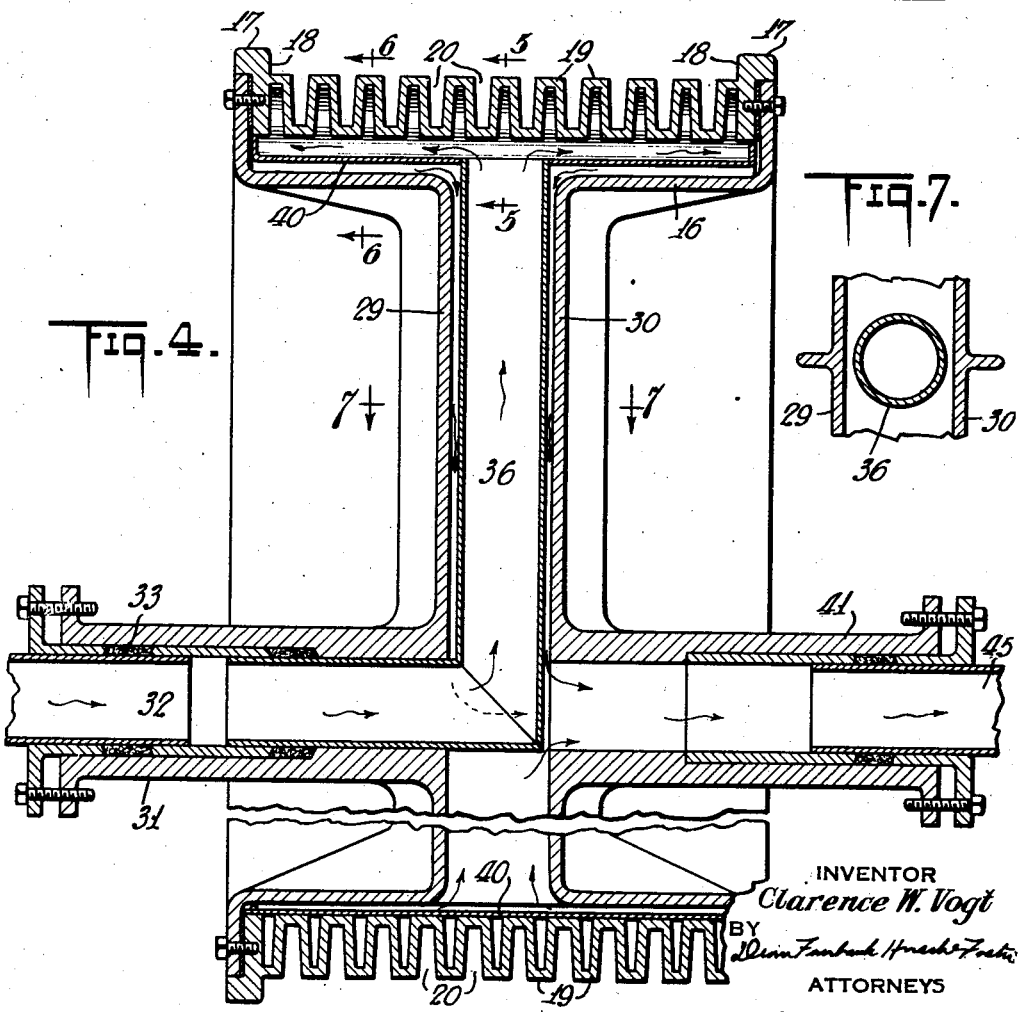

July 10, 1934.  C. W. VOGT  1,965,618
METHOD OF PROCESSING PLASTIC COMESTIBLES
Filed Nov. 13, 1930  4 Sheets-Sheet 3
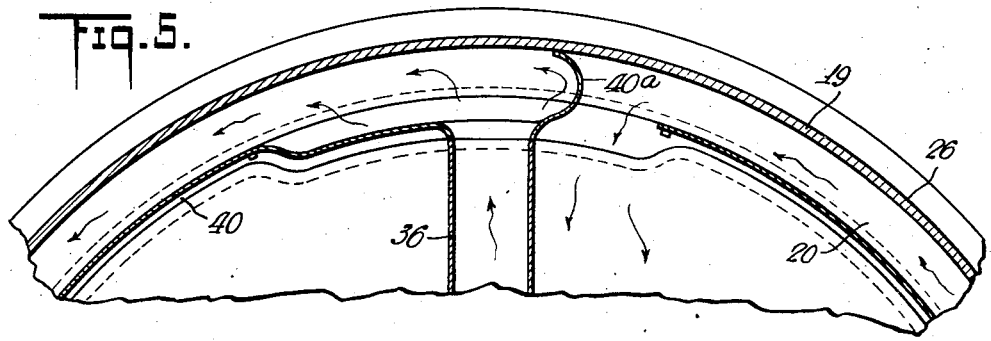
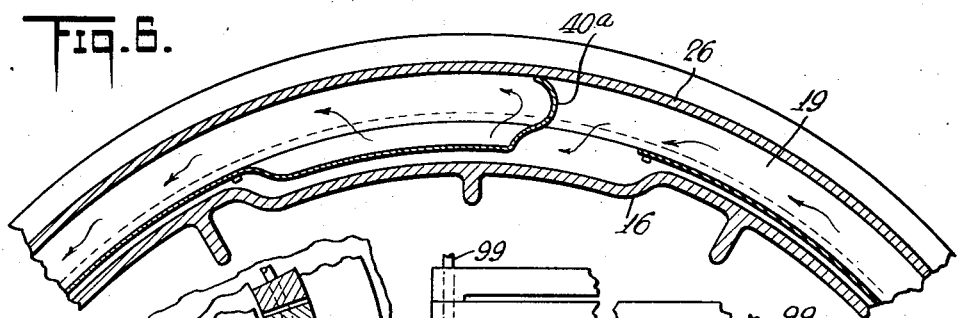
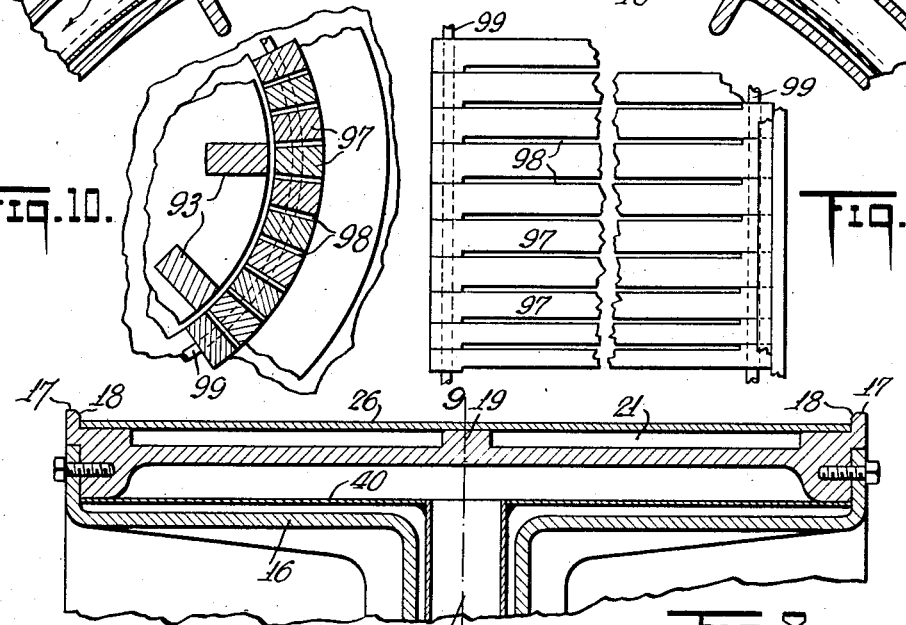
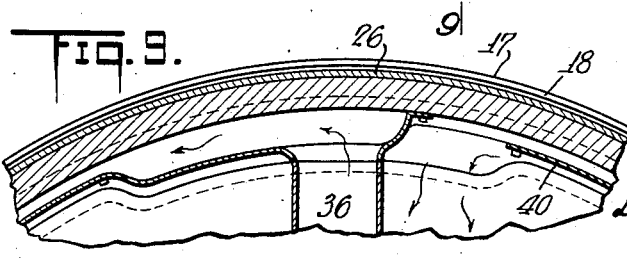
INVENTOR
Clarence W. Vogt
BY
ATTORNEYS Patented July 10, 1934

1,965,618

UNITED STATES PATENT OFFICE 1,965,618

METHOD OF PROCESSING PLASTIC COMESTIBLES

Clarence W. Vogt, Louisville, Ky., assignor, by mesne assignments, to Vogt Processes, Incorporated, Louisville, Ky., a corporation of Delaware Application November 13, 1930, Serial No. 495,369

5 Claims. (Cl. 99—13)

This invention relates to methods for working butter, plastic cream, margarin, and other butter substitutes and materials of a similar nature and/or consistency, by causing a change in physical structure of such materials.

In copending application of Vogt and Snyder, Serial No. 488,808, filed October 15, 1930, there are described certain general types of apparatus in general use for the chilling, and/or crystallizing, and/or setting of such products, and particularly animal and vegetable oils.

In my copending application Serial No. 492,727, filed November 1, 1930, I have disclosed certain novel methods and apparatus for chilling, freezing or setting material in a relatively quiescent state while in a confined chamber or space, and also the retention and/or production of pressure on the material under such treatment by the use of the methods and apparatus therein described.

This invention involves improved methods for working plastic and/or semi-plastic materials to cause coalescing of fat globules contained in emulsions which may have been previously set, partly set or solidified, for instance, by the use of methods and/or apparatus disclosed and described or referred to in the aforesaid applications, or which have been solidified or partly solidified by any other method, or by the mixing or emulsifying of ingredients of relatively different degrees of fluidity into a plastic or semi-plastic product.

One object is to provide a means whereby plastic material may be heated, chilled, cooled, or set while in a confined chamber of space, and from which it may be forced or extruded through a tortuous path in order to effect the blending or coalescing of dispersed fat globules into a continuous chain and while still thus confined.

A further object is to provide means for reforming the extruded or blended particles into any desired columnar form or molded shape which may be subsequently severed into suitable lengths.

A further object is to provide improved and effectively simple means whereby I secure the chilling or partial solidification of a relatively unagitated material in a confined space from which the atmosphere is excluded, and the extrusion or coalescing of the fat globules and subsequent reforming, printing, or molding of the extruded product before it is exposed to the surrounding or adjacent atmosphere.

Although my invention involves various novel features of construction and arrangement of the apparatus, it will be apparent that the details of construction are not essential so far as concerns my improved process. The process may be carried out in various other forms of apparatus than that illustrated in the accompanying drawings and certain features of the apparatus may be employed for carrying out other processes. Many of the features of the apparatus illustrated are disclosed more in detail in other copending applications and patents hereinafter referred to.

In these drawings:

Fig. 1 is a central vertical section of one form of apparatus in which my novel methods may be carried out.

Fig. 2 is a central vertical section of a portion of such apparatus, but on an enlarged scale.

Fig. 3 is a partial cross-section on a still larger scale of a portion of one form of the extrusion or working mechanism shown in Fig 2.

Fig. 4 is a central longitudinal section of one type of drum with multiple corrugations or channels, the belt being removed.

Fig. 5 is a partial section taken on the line 5—5 of Fig. 4, showing one way of attaching the baffle to the multiple channel shaped roll or drum.

Fig. 6 is a similar view to Fig. 5, but taken on the line 6—6 of Fig 4.

Fig. 7 is a sectional detail taken on the line 7—7 of Fig 4.

Fig. 8 is a partial section similar to a part of Fig. 4, but showing a different form of roll or drum with which the flexible belt forms wider and, if desired, thinner channel shaped spaces.

Fig. 9 is a partial cross-section taken on the line 9—9, of Fig. 8, showing one way of attachment of the baffle.

Fig. 10 is a section similar to Fig. 3, but showing another type of die.

Fig. 11 is a face view of the dies shown in Fig. 10, but at right angles thereto.

Fig. 12 is a side view, partly in section, of a two stage chiller, extruder, worker, and former.

Figure 13:
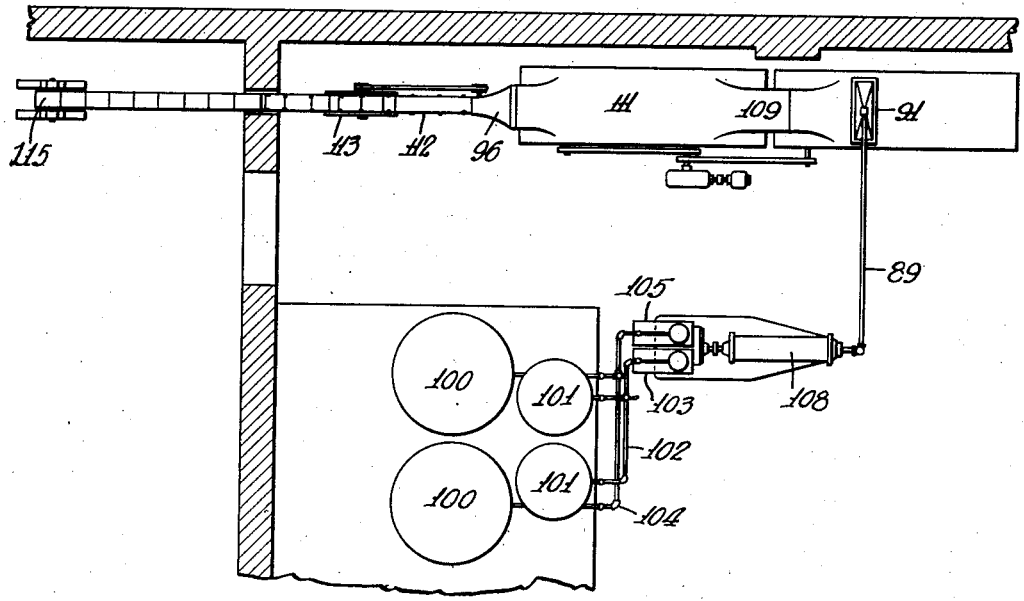
Fig. 13 is a diagrammatic plan of a complete plant for blending, chilling, setting, extruding, working, forming and severing of the formed product.

In Figs. 1 to 7 of the accompanying drawings I have illustrated merely one of many forms of apparatus embodying my invention and which may be used for carrying out my improved process. In this form I provide an internally cooled or refrigerated drum or conveyor 16, which is provided with peripheral flanges 17 at the ends, the opposed surfaces 18 of which act as guides for the edges of a belt. Between these flanges 17 are flanges 19 which act as bridges between the spaces 20 for the material. The flanges 19 also engage the surface of the belt and are of sufficient width to prevent the belt from sagging or entering the annular spaces or channels 20 shown in Fig. 4 and 21 shown in Fig. 8. The drum or roll 16 is trunnioned on a suitable frame, not shown, which frame may also support a belt carrying forming pulley 22, an idler pulley 23, a tension pulley 24, and a drive pulley 25. Around these pulleys extends a flexible imperforate belt 26, movable in the direction shown by the arrows in Fig. 1. This belt may be of metal if heat conducting is desired, or may be of fabric or any other suitable material if such heat conducting is not desired or is to be retarded. The belt will be maintained tight against the surface of the flanges 19 by the resistance to rotation of the drum 16 and also by the resistance to extrusion and/or forming and/or working as hereinafter more fully described.

In the specific form illustrated the parts acting on or actuated by the belt 26 are enclosed in an insulated chamber 27 which may be of any suitable form, for instance as more fully described in my copending application Serial No. 492,727.

The drum 16 is provided with enclosing ends 29 and 30 and an annular baffle 40. The heating, cooling or other temperature changing medium is delivered through a non-rotatable supply pipe 32 extending through a packing 33 in one trunnion 31 and may then flow through a radial pipe 36 to the outer side of the baffle 40 at one side of an out turned end 40a of the baffle. It is then forced to flow circumferentially along substantially the periphery of the drum and then inwardly between the end walls 29, 30 to the other trunnion 41 into which projects the non-rotatable outlet pipe 45. The temperature changing fluid may be of any character depending on the results sought. For chilling I preferably use brine. The construction of the drum, belt, pulley and adjustable supports for the pulley which are here illustrated are substantially the same as the corresponding parts shown in copending application Serial No. 492,727 and therefore are not described here in detail.

While I have shown the mechanism as being driven by pulley 25, it will be understood that the driving means may be attached to either trunnion 31 or 41 instead of to the pulley 25 if it is desired to reduce the pull or tension on the belt 26. It is obvious that, if the drum surface is of a form similar to that shown in Fig. 4, and if a relatively high extrusion pressure is desired, it may be desirable to connect the driving means directly to the roll instead of to the pulley 25.

However relatively high extrusion pressures are readily obtainable with a relatively small tension on the driving belt by maintaining a relatively narrow film, or layer, or columnar thickness in the spaces 20 or 21. For instance, if such layer be held at 1/16" thickness the belt pull or tension necessary to maintain an extrusion pressure of 300 pounds would be one-sixteenth of 300 pounds or less than 20 pounds per inch of belt width. Of course, in addition to this effective load there would be an additional pull required to overcome the friction load of the apparatus, but it will be readily seen that the belt need not be subjected to excessive or abnormal tension even with very high extrusion pressures. Furthermore, it may be desirable in some cases to drive both the belt and the roll in timed relationship so that the load will be divided between the two.

The material to be processed is delivered to a hopper 57 by any suitable means as for instance a conduit 58 which may have a float controlled valve 59 and a down turned delivery end 61. The material from the hopper enters the space between the belt and the drum 16 and travels around nearly the entire periphery of the drum in a substantially quiescent condition to a delivery conduit or former 63 which has fingers, scrapers or knives for removing the solid, plastic or semi-plastic material from the drum surface and guiding it into the conduit 63. This conduit or former 63 is jacketed by means of a surrounding wall, leaving a space which may serve for a heating or cooling liquid, or may be left empty, to provide a heat insulation for the former. The inlet and outlet connections to and from this jacket are not shown as they consist of the usual pipe connections or they may consist of electric wires and heating elements of the usual type depending upon the nature of the material being treated as to its resistance to movement and the temperature at which the material is discharged. Certain of the details of these parts and the function and operation thereof are set forth more in detail in the application above referred to.

As one important feature of the present invention the conduit 63 is provided with means for working and otherwise treating the material.

In Figs. 2 and 3 is shown one specific form of extruding and working means, which includes a perforated metallic screen 91, which is backed up by perforated arcuate plate 92 and held in place by flanges 63a. I have found that 50 to 80 mesh screen woven of wires of a diameter of approximately .010 to .006 inch, respectively, when backed up by a perforated plate 1/16" thick, containing 1/8" diameter holes or perforations, is suitable for coalescing or working of several of the margarin emulsions which have been previously set by chilling to approximately 50° F. This requires a force of approximately 30 to 50 pounds for its extrusion at a rate of approximately six to ten feet per minute through such combined screen and plate.

Obviously, this combination of screen and perforated dies is not necessarily the most desirable for all mixtures or materials which may be worked, extruded or coalesced, nor is the pressure range mentioned. Much greater pressures are readily and practicably obtainable, and for different materials a mesh of screen, a thickness of plate, a perforation diameter and a pressure, may be selected which are most suitable for the specific material being treated.

Another type of plate, which has the advantage of rigidity and simplicity of construction, and which also readily lends itself to cleansing, is that shown in Figs. 10 and 11. Such plates are constructed of bar shaped pieces 97 with opposing sides, narrowed except for a marginal distance from one end. When two of these bars are placed adjacent, there is formed a slit 98, or, if more than two are used, they form a plurality of such slits. When the sides of these bars are beveled radially, they will form an arcuate slitted wall or die with slits of the desired width to furnish the necessary resistance required for the change of phase, coalescing or working of the material. For convenience in handling these bars may be assembled by means of wires or rods 99 passing therethrough. Such bar shaped segments, when removed from the conduit 63, may be scrubbed clean without leaving any difficult crevices such as small slits or holes. With this construction the screen 91 may be omitted if desired. For most materials the transverse dimension of the apertures through which the material is forced, is less than ¼ inch.

The material to be treated enters the conduit moving in the direction indicated by the arrow, Fig. 2, and, after being forced through screen 91 and arcuate plate, may be paddled or worked by the cage-like rotor bars 93. The ends of these bars are connected to discs or wheels which are mounted in turn in a shaft which is rotatable by any suitable means such as a motor and gears, or by direct gearing from the shaft of pulley 25 or the belt of pulley 64.

The additional working, paddling or mulling may or may not be desired, depending on the particular product being handled. I have found that some additional working is desirable with certain vegetable oil mixtures or emulsions.

The extruded material, with or without the additional mulling, is then forced through nozzle 96, where it may also be cut longitudinally into a plurality of bars or columns by means of wire-cutters 94. The material leaving the nozzle 96 may be passed onto a carrying off mechanism 64. This may be of the usual belt and pulley type of conveyor or any other suitable type of mechanism, and it may be timed in connection with a cutting mechanism to cut the delivered material into suitable lengths such as the mechanism disclosed in my Patent No. 1,810,740, issued June 16, 1931, or as shown diagrammatically in Figs. 13 and 14 hereof.

In Fig. 12 there is shown diagrammatically a pair of chilling, conveying and extruding units in series, the material being supplied to the first of these units through conduit 89, and telescoping filling mechanism 90, as described in Patent 1,881,106, issued October 4, 1932.

In the first of these units it is progressively chilled, set and extruded and/or worked, and then delivered to the second unit, where it is again successively chilled, extruded, worked and then formed as hereinbefore described.

Some of the advantages of a series of units, such as shown in Fig. 12 are the following. The work of extrusion causes a rise in temperature of the material, and, as there is usually a narrow temperature range in which the most satisfactory texture and/or coalescence may be secured, the division of the work into two steps, with intermediate removal of the heat produced in the first step, permits this working to be accomplished with a lesser temperature rise, other conditions remaining similar. Also, as the material, after working and forcing is usually wrapped, this operation is facilitated by supplying the wrapping machines with a relatively firm product. With some material, it may be desired to effect one extrusion with subsequent chilling and forming, and, in such event, the extrusion dies (consisting, for instance, of screen 91 and plate 92) may be removed from the second unit, leaving only the worker 93 and/or nozzle 96 in the delivery end of this unit. With two sets of extruders in series it is also obvious that somewhat larger orifices may be provided in each set of extruder die or dies, and thus, less pressure is required for each extrusion. This may, of course, be carried even further by increasing the series beyond two units, depending, among other things, on the kind of materials under treatment, the quality of the product desired, the temperature range in which proper coalescing or working is obtainable, etc.

For the chilling and whitening of hydrogenated vegetable oils, sometimes referred to as lard substitutes and lard compounds, the use of a single exposed roll type of chiller in combination with the picker box, with or without a blender and/or texturator, and as more fully described in the previously referred to application Serial No. 488,808, it has been found, in some instances, that the use of an additional mechanism, including a hydraulic pump (of the well known duplex or triplex type) to build up a pressure of 250 to 350 pounds per square inch and, by means of such pressure, forcing or extruding of the chilled, whipped and/or blended material through a narrow orifice, causes the breaking up of any hard or vaseliney lumps present in the chilled material. The use of such additional means, it is claimed, causes an improvement in the color and texture of the product. Butter, margarin, plastic cream, and similar substances are composed of water and oil mixtures or emulsions, whereas lard substitutes are, preferably, water free products, and, thus, while one of the operations, namely, extrusion through a small orifice, as disclosed in this invention, is in some respect somewhat similar to that sometimes used in connection with the processing of lard and lard substitutes, the result is dissimilar, as well as the apparatus for carrying out the previous and subsequent operations.

The body of a lard or lard substitute is not a satisfactory body for a butter or butter substitute, nor is a lard or lard substitute as stiff as butter or butter substitute. For example, the type of pump and connections used in pumping lard or lard substitutes would not serve to pump butter or butter substitutes at the temperatures at which such latter mentioned materials are usually worked, the reason being that such a pump depends on alternate suction and forcing of the product through at least some portion of the pump mechanism. The maximum suction effect possible is about 15 pounds per square inch, and, where more pressure than this is required to cause movement of a product, obviously it cannot be sucked. Butter and butter substitutes are usually handled in bulk, and, even in the larger size plants they are handled in large pumps and are usually shovelled onto and off of the worker.

However, the herein disclosed type of apparatus is readily usable instead of the roll, picker box, blender and/or texturator, pump and extruder units for chilling, aerating and extruding lard, lard substitutes, lard compounds, and the like. Obviously, the herein disclosed apparatus possesses many advantages over the types heretofore used, some of the obvious advantages being:

1. Reduced space required for apparatus.
2. Reduced time of processing.
3. Elimination of moist air from the product.
4. Greater uniformity of air or gaseous content used for whitening of the product.
5. Less waste of materials because of the smaller residual mass remaining in the system after supply of fresh materials ceases.

With the type of chilling apparatus broadly claimed in Patents 1,783,864, 1,783,865 and 1,783,867, issued December 2, 1930, it is possible to obtain an hourly chilling capacity of over seven thousand pounds of lard substitute per hour with only ten square feet of effective refrigerated surface, as compared with the previously used types of apparatus requiring over one hundred square feet of refrigerated roll surface for this same capacity with the same temperature of primary refrigerant.

When such unit is coupled with the herein disclosed setting, filling and extruding apparatus, a completed processing unit is obtainable in which the amount of residual product (exclusive of that remaining in the container filling devices) is less than fifty pounds in a plant of an hourly production capacity of seven thousand pounds. Contrasted to this, the picker box, pump and connections for an apparatus of the exposed roll type of the same capacity will retain several hundred pounds of residual material. As this residual amount represents in the main, the amount of material required to charge the apparatus to its working condition, the time of processing is approximately in the same proportion, that is, one-fourth or less.

In previously mentioned application Serial No. 488,808 there is briefly described one type of apparatus used in chilling or setting margarin and butter substitutes. Another quite different method of crystallizing or setting which is also used in the manufacture of such product involves the water quenching method, in which a large stream of very cold (34° F.) water is dashed or directed against a smaller stream of the hot (95° to 120° F.) oil and milk mixture or emulsion, the resultant flowing into a tank where it remains for a period of several minutes, after which the crystallized material, floating on top of the water and the therein dissolved milk particles, is shovelled off into trucks. After each batch (approximately one ton) of crystallized material, has been shovelled off, the residual water and dissolved milk are drained off and wasted. Approximately ten times as much ice water is used as the amount of product obtained. With this method there is a very considerable wastage of the milk ingredients from the emulsion as these dissolve into the ice water which is drained off and/or subsequently worked out. However, the presence of a large amount of the cold water temporarily held within the mass of the set material prevents the rise in temperature during the setting period.

After the draining interval, during which the temperature of the crystallized material is held at about 50° F., the material is shovelled or dumped onto revolvable workers where it is given a kneading or mulling action. During this operation the coalescing of the fat particles in the crystallized mass, takes place, and, a larger amount of the previously entrained and emulsified water escapes, together with the therein dissolved milk solids. Salt is usually added or worked into the product while it is on the workers.

The working of the material, causes a heating up (and consequently softening of the product) and the product after being shovelled off or otherwise discharged from the workers is delivered to and held in a cold room where it is again cooled, after which it is printed or molded into the desired shape and wrapped and cartoned.

It is apparent that these operations require relatively great space, time and labor and are extremely wasteful of refrigeration, and milk ingredients. When butter substitutes are crystallized or chilled on an open roll, the material undergoes even a greater amount of subsequent working and standardizing operations.

In previously referred to application Serial No. 488,808 there is disclosed an apparatus usable in the processing of lard and butter substitutes, and referred to therein as B unit, for the prevention or reduction of temperature rise or kick up caused by the crystallization occurring after rapid cooling and agitation ceases. The herein described methods and apparatus are also particularly useful in connection with the processing of these products through this step, and, in addition through subsequent steps.

Figure 14:
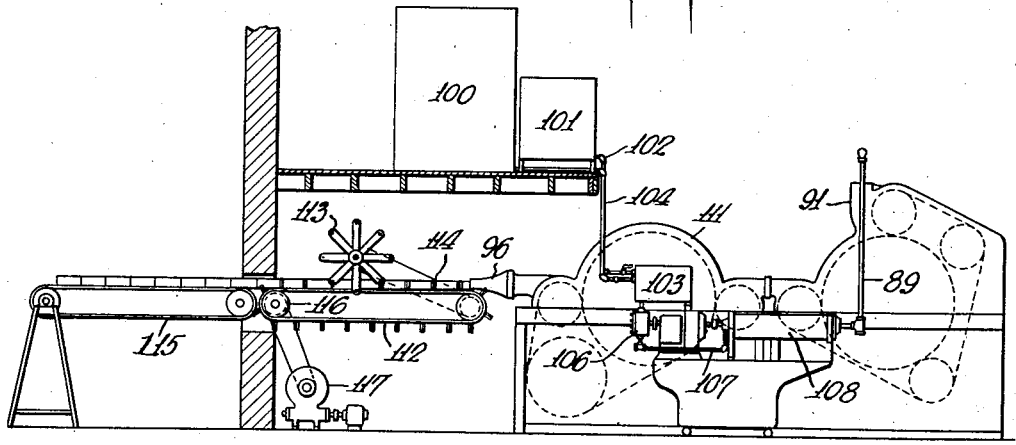
Fig. 14 is a diagrammatic elevation of the plant shown in Fig. 13.

In Figs. 13 and 14 there is shown somewhat diagrammatically a plant for producing margarin from liquids to the completely formed material ready for wrapping. This equipment is suitable for the complete processing of over two tons per hour.

There are shown oil mixing and holding tanks 100, and milk and salt mixing tanks 101. Two separate tanks for each of these classes of ingredients is preferably provided as, with this duplicate arrangement, one of each of the oil and milk tanks can be undergoing filling while the other of each of the pairs of tanks is being drawn from in the continuous operation of the chilling and other apparatus. For instance, one could mix in one tank 100 various oils or certain ingredients in the desired relative proportion, these ingredients usually including, in the case of vegetable margarin, cottonseed oil, peanut oil, soya bean oil, and cocoanut oil. Into each of the milk tanks the desired amount of salt is added. The milk is previously cultured and contains the desired proportion of milk solids and/or any other ingredients such as salt and also the proper and desired amount of water. It will be understood that these tanks would in practice be equipped with agitating means to maintain a thorough mixing of the various ingredients and to prevent the settling out of any of the heavier ingredients.

Outlet pipes 102 from the oil and milk tanks 101 and outlet pipes 104 from the oil mixing tanks 100 are suitably valved by means of three-way valves or any other desired mechanism, and are connected to float tanks 103 and 105 respectively. These float tanks are in turn connected by suitable pipe connections to a mixing and proportioning pump 106 which is preferably of the type disclosed in my Patent 1,902,315, issued March 21, 1933, in which they are mixed in definite, predetermined proportions. This pump 106 discharges the mixture of oils and milk through pipe line 107 and through one or more processing units 108 of the type described in my prior application 488,808, or in my prior Patents Nos. 1,783,864, 1,783,865, 1,783,866, 1,783,867, 1,847,149 and 1,940,473. In such processing units the material is advanced by means of a pump through a thin confined space, and in such thin confined layer it is subjected to the action of a refrigerant acting through one of the walls defining the thin space, and is mechanically agitated and/or scraped from the refrigerated wall.

After the mixture or emulsion has been chilled while being rapidly agitated during its passage through the unit 108 it is passed through conduit 89 and delivered therefrom into the hopper 91 (see Fig. 12) of the combined chilling, setting and extrusion unit.

By means of the rotation of the first roll or drum 16, together with the belt 26, the material is advanced, chilled and set in the confined conduit formed between the roll or drum surface and the juxtaposed belt. It is successively extruded by being forced through the screen and plate shown in Figs. 2 and 3 or alternatively through the elongated slits 98, if the type of extruding die shown in Figs. 10 and 11 is utilized, and it is thence worked or mulled by the paddles 93 from whence it passes through conduit 109 into a second chilling, extruding, etc., unit 111.

As shown diagrammatically in Figs. 12, 13 and 14, this second unit is driven at the same rate of speed and by means of the same motor and speed reduction unit 110. The secondary chilling and/or extrusion unit 111, indicated on Fig. 12, is shown slightly modified in that the conduit or formed passageway only occupies approximately one-half of the roll surface as contrasted to three-fourths of the roll surface of the first chilling and extrusion unit shown in Fig. 12. The reason for this is that there is less heat to be removed in this second unit 111 as the only heat required to be removed from this second unit is that which has been added to the product due to extrusion, mulling, and advancement through the conduit 109. The primary chilling unit may remove all of the heat of crystallization occurring from the setting of the material. Material supplied to the secondary chilling unit 111 is advanced in the direction of the arrow, Fig. 12, until it reaches conduit 63 where it is collected and directed through the second extrusion and working unit, if such be employed, and thereafter formed into the desired contour or shape by passing through the forming nozzle 96. The material issuing from this forming nozzle in the form of a bar or column or other desired shape, passes on to the moving conveyor 112 (Figs. 13 and 14), where it is cut into the desired unit lengths by the revolving reel 113 which is equipped with the usual wire cutters, guided by means of registering slots or other suitable mechanism 114. These unit lengths then pass to the carry-off belt or other mechanism 115 by which they are transported to the usual wrapping and packaging machines.

The cutting mechanism 112 and 113 is driven by any suitable means, such for instance as the usual friction disc drive 116 shown diagrammatically in Fig. 14. This friction drive is actuated by suitable means such as a motor, a speed reducer 117 and belt. The type of cutter shown is similar to those that have been in use in the cutting of plastic material such as unburned brick and tile which are driven through a friction means which is adjustable to provide sufficient power for cutting the material but which operates only at the speed determined by the rate of the expressing of the column of material onto the conveyor 112.

It will be understood, of course, that any desired cutting, wrapping, or packing means may be employed as the exact type does not constitute part of this invention.

When processing margarin and vegetable oils, the confined channel shaped space should be of such dimension and the drum and belt should operate at such speed as to retain the material in contact with the drum surface a sufficient length of time to permit the proper setting and the removal of a substantial portion of the heat of crystallization caused by such setting, whereupon it may be extruded with subsequent chilling if desired. I have found that the elimination of all unnecessary mulling or friction on the particles of material such as contained in the usual butter substitute is very desirable as it prevents the formation of a pasty or salvy structure which is obtainable either in a butter or a butter substitute.

While a molding or printing unit, based on the principle of coacting screws, has been used to force and form materials such as butter and butter substitutes through plates and nozzles containing relatively large perforations, for instance, of the size of a cross-section dimension of a one-quarter pound, one-half pound or one pound cake of butter, it is undesirable to attempt utilization of this screw principle to obtain sufficient force for extrusion of such or similar material through a screen or die or apertures of sufficient size to effect coalescence of the fat globules. It can be readily understood that the screw principle is relatively inefficient mechanically and that a substantial amount of frictional heat is set up due to slippage of such a screw. While such frictional heat may not be objectionable with some types of plastic materials, it has been found that the excessive mulling and/or heating of margarin, butter substitutes, hydrogenated vegetable oils, and similar materials, after they have reached a semi-solidified, or set condition, damages the texture of such materials and causes a condition sometimes described as salvy.

While I do not know of any previous process or apparatus which has been used or which is suitable for the extrusion of margarin or butter substitutes through narrow slits or apertures as herein disclosed, it will be seen that this extrusion could be performed by means of noodle or macaroni presses with minor modifications. I have not shown such apparatus as an alternative since it represents an intermittent or batch operation and therefore does not have the degree of adaptability to continuous processing as the herein disclosed apparatus, but I consider this invention as covering such an apparatus for the purposes herein set forth.

A further objectionable feature to the use of the screw or press type of apparatus is that the product is more likely to be unduly exposed to the atmosphere with the resultant oxidation or contamination or damaging of the product. It is well known that articles which have been oxidized become rancid much more quickly than those which have not been oxidized. With the use of methods and apparatus of the type herein disclosed, materials such as margarin, butter substitute, plastic cream, vegetable oils, etc., can be chilled and processed from a free flowing liquid up to the point of wrapping and/or packaging and/or packing without having come in contact with atmospheric air. It is further obvious that, by addition of the method disclosed in my Patent 1,810,740, this material passing through the molder can be wrapped or encased on all sides with material such as paper, substantially without contacting with the surrounding atmosphere, although it may or may not be impregnated, or charged, or have whipped into it prefiltered air, desiccated air, non-toxic gas, inert gas or any other fluid, liquid, solid, or partly solidified ingredient or ingredients, and, if desired, in definite, predetermined and desirable proportions.

Having thus described my invention, what I claim as new and desire to secure by Letters Patent is:

1. The method of processing plastic oleaginous comestibles, including advancing the material in a comparatively thin confined layer, agitating the material and subjecting it to a temperature lowering medium while in said layer, thereafter advancing said material in a substantially quiescent state in a comparatively thin confined layer, simultaneously subjecting it to the action of a temperature changing medium, and forcing the material through comparatively small apertures, none of the ingredients being permitted to escape from the material during the processing and all being included in the final product.

2. The process of changing a material from a liquid to a solid or semi-solid condition, which includes advancing the material in a comparatively thin confined layer, agitating the material and subjecting it to a temperature lowering medium while in said layer, thereafter advancing said material in a substantially quiescent state in a confined passage of substantially uniform cross-sectional area, simultaneously subjecting it to the action of a temperature changing medium, and forcing the material through comparatively small apertures, the material being continuously confined during and between said steps whereby none of the ingredients is permitted to escape from the material during the processing and all are included in the final product.

3. The process of changing a material from a liquid to a solid or semi-solid condition, which includes advancing the material in a comparatively thin confined layer, agitating the material and subjecting it to a temperature lowering medium while in said layer, thereafter advancing said material in a substantially quiescent state in a confined passage of substantially uniform cross-sectional area, and forcing the material through comparatively small apertures, the material being continuously confined during and between said steps whereby none of the ingredients is permitted to escape from the material during processing and all are included in the final product.

4. The process of changing a material from a liquid to a solid or semi-solid condition, which includes advancing the material as a confined stream, agitating the material and subjecting it to a temperature lowering medium while in said stream, thereafter advancing said material in a substantially quiescent state in a confined passage of substantially uniform cross-sectional area, simultaneously subjecting it to the action of a temperature changing medium, and forcing the material through comparatively small apertures, the material being continuously confined during and between said steps whereby none of the ingredients is permitted to escape from the material during the processing and all are included in the final product.

5. The process of changing a material from a liquid to a solid or semi-solid condition, which includes advancing the material as a confined stream, agitating the material and subjecting it to a temperature lowering medium while in said stream, thereafter advancing said material in a substantially quiescent state in a confined passage of substantially uniform cross-sectional area, and forcing the material through comparatively small apertures, the material being continuously confined during and between said steps whereby none of the ingredients is permitted to escape from the material during the processing and all are included in the final product.

CLARENCE W. VOGT.